(12) United States Patent
Woo

(10) Patent No.: US 7,974,236 B2
(45) Date of Patent: Jul. 5, 2011

(54) APPROACH FOR CONFIGURING WI-FI DEVICES

(75) Inventor: James Woo, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 882 days.

(21) Appl. No.: 11/941,684

(22) Filed: Nov. 16, 2007

(65) Prior Publication Data

US 2009/0129347 A1    May 21, 2009

(51) Int. Cl.
*H04W 4/00* (2009.01)

(52) U.S. Cl. ....................... 370/328; 370/338; 455/426.2

(58) Field of Classification Search ........................ None
See application file for complete search history.

(56) References Cited

U.S. PATENT DOCUMENTS

| | | | |
|---|---|---|---|
| 2002/0009995 A1* | 1/2002 | Fujii ............................. 455/435 |
| 2005/0130647 A1* | 6/2005 | Matsuda et al. ............ 455/426.2 |
| 2005/0132193 A1* | 6/2005 | Ishidoshiro et al. .......... 713/171 |
| 2005/0136930 A1* | 6/2005 | Dent ............................. 455/445 |
| 2005/0190733 A1* | 9/2005 | Ishidoshiro .................... 370/338 |
| 2005/0201557 A1* | 9/2005 | Ishidoshiro ...................... 380/44 |
| 2005/0238172 A1* | 10/2005 | Tamura .......................... 380/270 |
| 2005/0272420 A1* | 12/2005 | Matsuda et al. ............ 455/426.2 |
| 2007/0086399 A1* | 4/2007 | Akiyama ....................... 370/338 |
| 2007/0206527 A1* | 9/2007 | Lo et al. ......................... 370/328 |
| 2008/0130537 A1* | 6/2008 | Kim et al. ..................... 370/310 |
| 2009/0059878 A1* | 3/2009 | Tamura ......................... 370/338 |
| 2010/0202426 A1* | 8/2010 | Matsuda et al. .............. 370/338 |

* cited by examiner

*Primary Examiner* — Steven H Nguyen
(74) *Attorney, Agent, or Firm* — Hickman Palermo Truong & Becker LLP; Edward A. Becker

(57) ABSTRACT

According to an approach for configuring Wi-Fi devices, a wireless access point changes its mode of operation from a normal operating mode to a configuration operating mode to configure one or more Wi-Fi devices. When operating in the configuration operating mode, it is more difficult for an eavesdropper to intercept messages between the wireless access point and the Wi-Fi devices being configured. Upon completion of the configuration process, the wireless access point changes its mode of operation from the configuration operating mode back to the normal operating mode. This approach reduces the likelihood of an eavesdropper intercepting configuration messages exchanged between a wireless access point and one or more Wi-Fi devices during the configuration process. The approach also allows automated configuration of Wi-Fi devices and reduces the amount of user interaction required to configure Wi-Fi devices.

18 Claims, 4 Drawing Sheets

FIG. 1

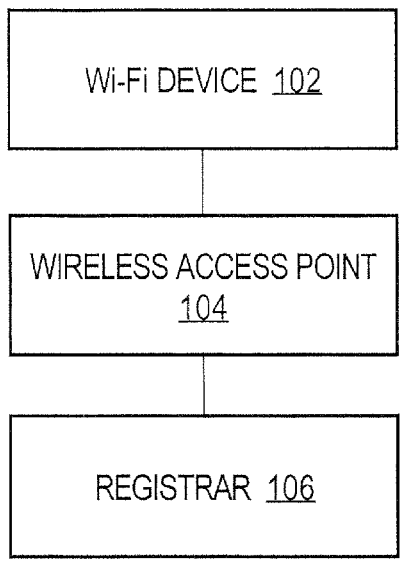

FIG. 2

202 — WIRELESS ACCESS POINT RECEIVES A CONFIGURATION REQUEST FROM AN UNREGISTERED Wi-Fi DEVICE

204 — WIRELESS ACCESS POINT CHANGES ITS OPERATING MODE FROM A NORMAL OPERATING MODE TO A CONFIGURATION OPERATING MODE

206 — WIRELESS ACCESS POINT REGISTERS THE UNREGISTERED Wi-Fi DEVICE BY EXCHANGING ONE OR MORE CONFIGURATION MESSSAGES WITH THE UNREGISTERED Wi-Fi DEVICE

208 — UPON REGISTRAION OF THE Wi-Fi DEVICE THE WIRELESS ACCESS POINT CHANGES ITS OPERATING MODE FROM THE CONFIGURATION OPERATING MODE TO THE NORMAL OPERATING MODE

APPROACH FOR CONFIGURING WI-FI DEVICES

FIELD OF THE INVENTION

This invention relates generally to Wi-Fi devices, and more specifically, to an approach for configuring Wi-Fi devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Wi-Fi enabled devices have grown in popularity because of the convenience that they provide to users. For example, many consumer electronics products, such as laptop computers, game consoles, televisions and cameras are now Wi-Fi enabled, which allows the devices to connect to wireless networks. As used herein, the term "Wi-Fi device" refers to a wireless device that supports the 802.11 standard. Wi-Fi devices must be configured with correct configuration parameter values before they can communicate with wireless access points. For example, a Wi-Fi device must be configured with the security parameters of a particular wireless access point to be able to communicate securely with the wireless access point. Manually entering configuration data can be a confusing and tedious process for many users. For example, a user may need to enter a MAC address of the user's Wi-Fi device and/or the wireless access point, one or more encryption keys to be used to encrypt communications, as well as a variety of other parameter values. Many users are not familiar with the terminology used to describe certain parameters and many graphical user interfaces generated by wireless access points are not designed to accommodate novice users. Furthermore, the information must be entered accurately. Even a single error in any of the parameter values can prevent the successful configuration of a Wi-Fi device. For many users, this results in a frustrating experience.

Because of these issues, more automated configuration processes for configuring Wi-Fi devices have been developed. With these automated configuration processes, some or all of the configuration information is automatically exchanged between wireless access points and Wi-Fi devices. This reduces the amount of data that has to be manually entered by users and increases the likelihood of a successful configuration. One of the issues with automated configuration approaches is that the configuration values exchanged between Wi-Fi devices and wireless access points are susceptible to third party attack. In a "man in the middle attack," a third party attacker is able to read, insert and modify at will, messages between the two parties without either party knowing that the communications between them has been compromised. When used without authentication, this type of attack can foil the use of public-key cryptography and in particular the Diffie-Hellman key exchange protocol. An authentication method, such as the use of a shared secret known only by wireless device and wireless access points, can be used to foil any attacks. For example, a user may be required to enter a PIN into a Wi-Fi device that is used to authenticate the Wi-Fi device. Once the PIN has been authenticated by the wireless access point, the Wi-Fi device can be properly configured. One problem with this approach is that a Wi-Fi device must generate a PIN and display the PIN to a user on a display during configuration. Then the user enters the PIN into the Wi-Fi device. The use of a shared secret, such as a PIN, complicates the configuration process and prevents fully automated configuration. Furthermore, on headless Wi-Fi devices, i.e., devices without a display, the PIN is static and generally provided to a user via a sticker on the device or documentation that accompanies the device. Using a static PIN makes a device more susceptible to third party attacks.

SUMMARY

According to an approach for configuring Wi-Fi devices, a wireless access point changes its mode of operation from a normal operating mode to a configuration operating mode to configure one or more Wi-Fi devices. When operating in the configuration operating mode, it is more difficult for an eavesdropper to intercept messages exchanged between the wireless access point and the Wi-Fi devices being configured. Upon completion of the configuration process, the wireless access point changes its mode of operation from the configuration operating mode back to the normal operating mode. This approach reduces the likelihood of an eavesdropper intercepting configuration messages exchanged between a wireless access point and one or more Wi-Fi devices during the configuration process. The approach also allows automated configuration of Wi-Fi devices and reduces the amount of user interaction required to configure Wi-Fi devices.

According to one embodiment of the invention, a wireless access point receives a configuration request from an unregistered Wi-Fi device. In response to receiving the configuration request from the unregistered Wi-Fi device, the wireless access point changing an operating mode from a normal operating mode to a configuration operating mode by changing one or more operating parameter values from one or more original values to one or more configuration mode values. The wireless access point exchanges one or more configuration messages with the unregistered Wi-Fi device to register the unregistered Wi-Fi device with the wireless access point. Upon registering the unregistered Wi-Fi device with the wireless access point, the wireless access point changes its operating mode from the configuration operating mode to the normal operating mode by changing the one or more values of the operating parameters from the one or more configuration mode values to the one or more original values.

BRIEF DESCRIPTION OF THE DRAWINGS

In the figures of the accompanying drawings like reference numerals refer to similar elements.

FIG. 1 is a block diagram that depicts an arrangement for configuring a Wi-Fi device according to one embodiment of the invention.

FIG. 2 is a flow diagram that depicts an approach for configuring Wi-Fi devices according to one embodiment of the invention.

DETAILED DESCRIPTION

Figure 3A:
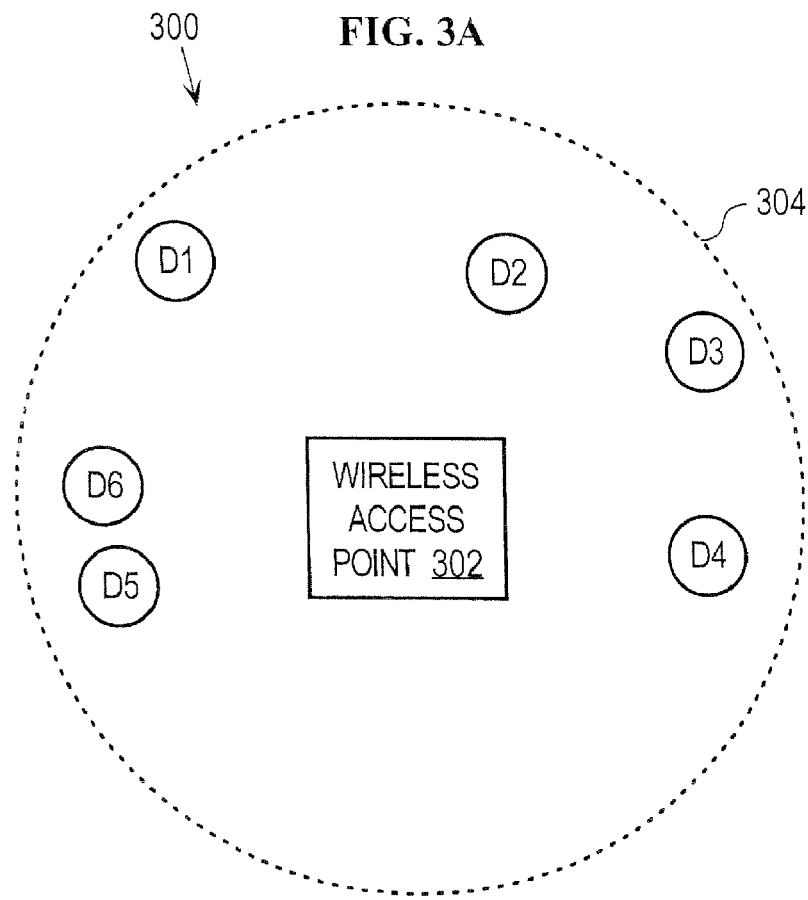
FIG. 3A is a block diagram that depicts a conventional Wi-Fi arrangement that includes a wireless access point and six Wi-Fi devices, identified as D1-D6.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. Overview
II. Architecture Overview
III. Secure Wi-Fi Device Configuration
 A. Lowest Transmit Power
 B. Highest Transmission Rate
 C. Elimination of Re-Transmitted Data
 D. Narrow Transmission Beam
 E. Highest Antenna Attenuation
IV. Implementation Mechanisms I. Overview According to an approach for configuring Wi-Fi devices, a wireless access point changes its mode of operation from a normal operating mode to a configuration operating mode to configure one or more Wi-Fi devices. When operating in the configuration operating mode, it is more difficult for an eavesdropper to intercept messages exchanged between the wireless access point and the Wi-Fi devices being configured. Upon completion of the configuration process, the wireless access point changes its mode of operation from the configuration operating mode back to the normal operating mode. This approach reduces the likelihood of an eavesdropper intercepting configuration messages exchanged between a wireless access point and one or more Wi-Fi devices during the configuration process. The approach also allows automated configuration of Wi-Fi devices and reduces the amount of user interaction required to configure Wi-Fi devices.

II. Architecture Overview

FIG. 1 is a block diagram that depicts an arrangement 100 for configuring a Wi-Fi device according to one embodiment of the invention. Arrangement 100 includes a Wi-Fi device 102, a wireless access point 104 and a registrar 106. Arrangement 100 represents an arrangement as described in the "Wi-Fi Protected Setup Specification," Version 1.0h, December 2006, published by the Wi-Fi Alliance, the contents of which are hereby incorporated herein by reference for all purposes. The Wi-Fi device 102 is an unregistered Wi-Fi device and is sometimes referred to as an enrollee. Although only a single Wi-Fi device 102 is depicted in FIG. 1, the approach is applicable to any number of Wi-Fi devices. Wireless access point 104 may be any type of Wi-Fi wireless access point. Wireless access point 104 may include any number of hardware and software modules, depending upon a particular implementation. For example, wireless access points conventionally include an antenna, a transceiver module, one or more processors, local storage, such as volatile and non-volatile memory and one or more software processes for controlling and managing communications. Registrar 106 is an entity with the authority to issue and revoke domain credentials that allow Wi-Fi devices to wireless access point 104. Registrar 106 is depicted as being an external registrar with respect to wireless access point 104 but may be implemented as part of wireless access point 104. Furthermore, multiple registrars may be used. The approach described herein for configuring Wi-Fi devices does not require the use of a registrar and may be implemented in systems where a registrar is not used. Furthermore, the approach is applicable to both in-band and out-of-band configuration techniques.

III. Secure Wi-Fi Device Configuration

According to one embodiment of the invention, secure Wi-Fi device configuration is performed by a wireless access point changing its mode of operation from a normal operating mode to a configuration operating mode to configure one or more Wi-Fi devices. When operating in the configuration operating mode, it is more difficult for an eavesdropper to intercept messages exchanged between the wireless access point and the Wi-Fi devices being configured. Upon completion of the configuration process, the wireless access point changes its mode of operation from the configuration operating mode back to the normal operating mode.

According to one embodiment of the invention, the wireless access point changes its operating mode from the normal operating mode to the configuration operating mode by changing one or more operating parameter values from one or more original values to one or more configuration mode values. The configuration operating mode may be characterized by a wide variety different behavior to improve security, depending upon a particular implementation. Examples include reducing the transmit power of the wireless access point, using the highest transmission rate, no re-transmission of transmitted data, using a narrow transmission beam and using antenna attenuation.

FIG. 2 is a flow diagram that depicts an approach for configuring Wi-Fi devices according to one embodiment of the invention. In step 202, a wireless access point receives a configuration request from an unregistered Wi-Fi device. For example, wireless access point 104 may receive a probe request message from Wi-Fi device 102.

In step 204, in response to receiving the configuration request from the unregistered Wi-Fi device, the wireless access point changes its operating mode from a normal operating mode to a configuration operating mode to provide enhanced security. For example, in response to receiving the probe request message from Wi-Fi device 102, wireless access point 104 changes its operating mode from a normal operating mode to a configuration operating mode by changing one or more operating parameter values from one or more original values to one or more configuration mode values.

In step 206, the wireless access point registers the unregistered Wi-Fi device by exchanging one or more configuration messages with the unregistered Wi-Fi device. The configuration messages may provide any type of configuration information to an unregistered Wi-Fi device. For example, wireless access point 104 may provide to Wi-Fi device 102 one or more encryption keys and configuration parameter values, such as security settings values. As another example, wireless access point 104 and Wi-Fi device 102 may exchange messages M1-M8 as described in the Wi-Fi Protected Setup Specification. Wireless access point 104 may also update local data store on wireless access point 104 to reflect the registration of Wi-Fi device 102.

In step 208, after completing the registration process, the wireless access point changes its operating mode from the configuration operating mode back to the normal operating mode. For example, wireless access point 104 changes one or more operating parameter values from the configuration mode values back to the original values. The registration process may be completed when one or more Wi-Fi devices are successfully configured or if an error occurs.

A. Lowest Transmit Power

FIG. 3A is a block diagram that depicts a conventional Wi-Fi arrangement 200 that includes a wireless access point 302 and six Wi-Fi devices, identified as D1-D6. In FIG. 3A, wireless access point 302 operates with a normal transmit power level that provides a coverage "footprint" 304 that covers all Wi-Fi devices D1-D6. Note that the footprint 304 is depicted in FIG. 3A as a circle for purposes of explanation only. In actual practice, footprint 304 may have a wide variety of shapes and lobes, depending upon, for example, the antenna configuration and obstacles. In this configuration, all of the Wi-Fi devices D1-D6 are able to receive all of the transmissions made by wireless access point 302, which can undermine security during device configuration.

Figure 3B:
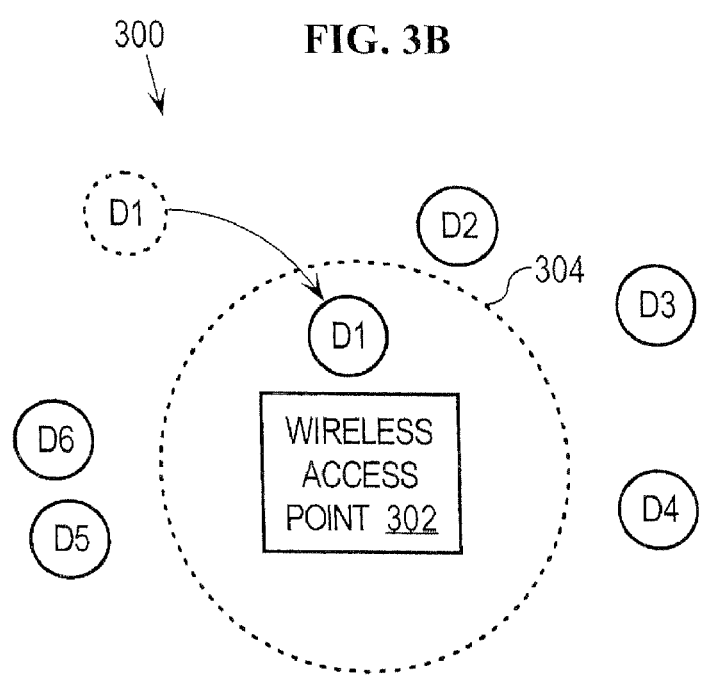
FIG. 3B is a block diagram that depicts a wireless access point operating with a reduced footprint, according to an embodiment of the invention.

FIG. 3B depicts wireless access point 302 operating with reduced transmit power to reduce the size of its transmission "footprint" 304. This limits the number of Wi-Fi devices D1-D6 that are able to intercept transmissions. In the present example, the footprint 304 has been reduced to a point where none of the Wi-Fi devices D1-D6 are currently able to intercept transmissions made by wireless access point 302. Assuming that Wi-Fi device D1 is to be configured to operate with wireless access point 302, then Wi-Fi device D1 is moved into close proximity of wireless access point 302 so that Wi-Fi device D1 is within the smaller footprint 304 provided by the reduced transmit power. For example, a user may physically move Wi-Fi device device D1 into close proximity of wireless access point 302 so that Wi-Fi device D1 is within the reduced footprint 304. In this situation, only Wi-Fi device D1 is within the smaller footprint 304, which reduces the likelihood that a third party can eavesdrop on communications between Wi-Fi device D1 and wireless access point 302 while Wi-Fi device D1 is being configured. It is possible that the other Wi-Fi devices D2-D6 could also move within the reduced footprint 304, but they would have to do so during the configuration of Wi-Fi device D1 to be able to intercept any of the critical information. The security can be enhanced by reducing the effective range of footprint 304 to a very small area, for example, a few feet. Once Wi-Fi device D1 has been configured, it can communicate securely with wireless access point 302 and the other Wi-Fi devices will not be able to intercept and use the communications. Thus, once Wi-Fi device D1 has been successfully configured, then wireless access point changes its transmit power from the configuration power level back to the normal power level. This returns the footprint 304 to the original size depicted in FIG. 3A and allows wireless access point 302 to communicate with all Wi-Fi devices D1-D6.

B. Highest Transmission Rate

According to another embodiment of the invention, wireless access point 104 increases its transmission rate during configuration of Wi-Fi devices to reduce the amount of time that data is being transmitted during the configuration process. For example, the normal operating mode may include operating parameter values that specify a normal data transmission rate, while the configuration operating mode includes operating parameter values that specify a higher data transmission rate. Higher transmission rates may also reduce the effective transmission range. Thus, using a higher data transmission rate during Wi-Fi device configuration makes it less likely that an eavesdropper can intercept data transmitted between wireless access point 104 and any Wi-Fi devices being configured.

C. Elimination of Re-Transmitted Data

According to another embodiment of the invention, wireless access point 104 reduces the amount of retransmitted data during configuration of Wi-Fi devices to reduce the amount of data that can be intercepted during the configuration process. For example, the normal operating mode may include operating parameter values that specify a maximum re-transmission value. The maximum re-transmission value indicates the maximum number of times that data is retransmitted in the event of an error or no acknowledgement. For example, in the normal operating mode, data may be re-transmitted up to X number of times. In the configuration operating mode, data may be transmitted up to Y number of times, where X and Y are integers and X>Y. Reducing the number of times that data can be re-transmitted reduces the amount of data that can be intercepted during Wi-Fi device configuration. The number of times that data may be retransmitted during configuration may be set to any value, depending upon a particular application, including zero. For example, the maximum re-transmission value may be set to zero, meaning that configuration data is sent only once. This eliminates any re-transmitted data.

D. Narrow Transmission Beam

Figure 3C:
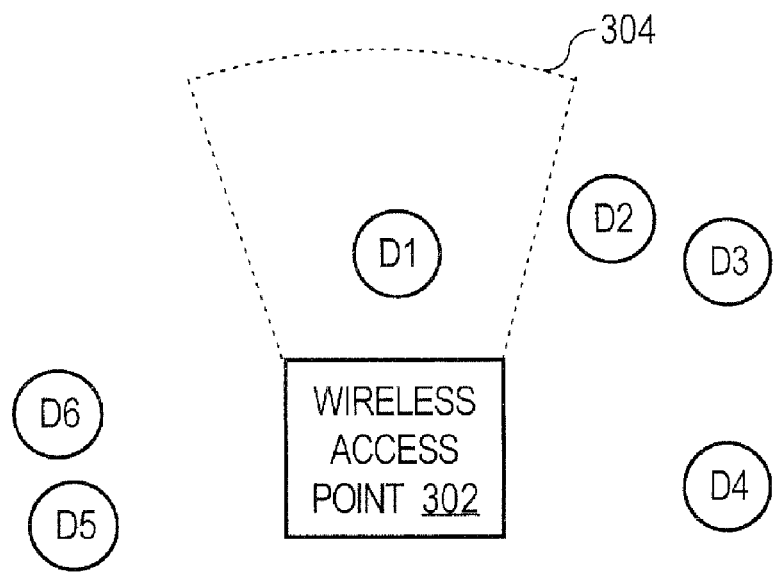
FIG. 3C is a block diagram that depicts a wireless access point operating with a narrowed footprint, according to an embodiment of the invention.

According to another embodiment of the invention, wireless access point 104 communicates using a narrow transmission beam to reduce the likelihood of an eavesdropper intercepting configuration data. As depicted in FIG. 3C, the footprint 304 has been narrowed from an omni-directional footprint to a smaller footprint 304. In the example depicted in FIG. 3C, only Wi-Fi device D1 is within footprint 304 and can receive data transmitted by wireless access point 104. This reduces the likelihood of another Wi-Fi device intercepting configuration messages exchanged between wireless access point 104 and Wi-Fi device D1 unless another Wi-Fi device moves into the narrower footprint 304. This technique may limit the ability of wireless access point 104 to communicate with other Wi-Fi devices that are not within footprint 304. Thus, upon completion of the configuration process, the footprint 304 is restored to the footprint of the normal operating mode. The narrow transmission beam may be any shape or size.

A wide variety of techniques may be used to provide a narrow transmission beam, depending upon a particular implementation, and the approach is not limited to any particular technique. For example, wireless access point 104 may be configured with multiple antennas, where each antenna covers a particular angular area around wireless access point 104. If wireless access point 104 has six antennas, then each antenna covers 60 degrees, assuming equal coverage among the antennas. In actual practice, the antennas may cover different angular areas. In this type of implementation, wireless access point 104 only transmits on the antenna that covers the Wi-Fi device being configured. For example, the footprint 304 depicted in FIG. 3C may be created by a particular antenna from N number of antennas at wireless access point 302. To improve security, wireless access point 302 transmits on only the particular antenna while configuring Wi-Fi device D1.

Figure 3D:
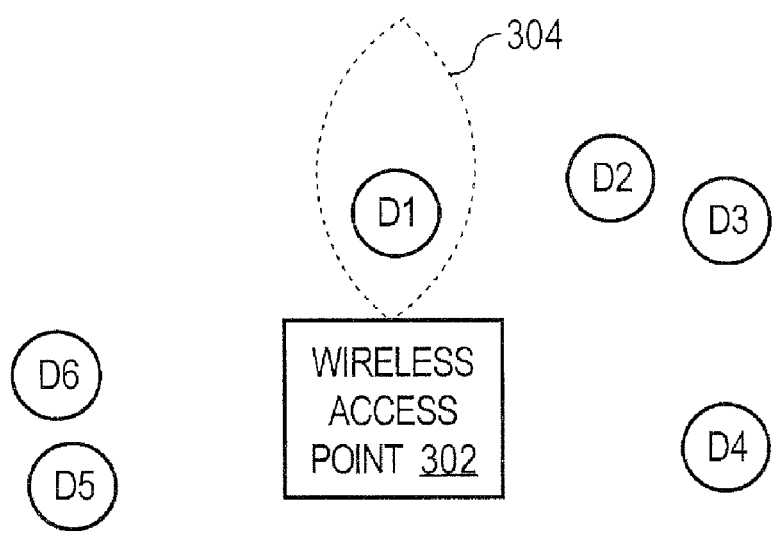
FIG. 3D depicts a wireless access point transmission footprint as a single lobe.

Multiple antenna configurations also allow transmissions to be shaped and focused. This may include transmitting on one or several antennas to obtain a desired transmission footprint shape and focus. For example, FIG. 3D depicts footprint 304 as a single lobe. Lobes of any size, shape and number may be used. A variety of "beam steering" or transmission shaping techniques may be employed to narrow the transmission beam. In addition, narrowing the transmission beam may be used in combination with reducing the transmit power to reduce the size of footprint 304. For example, the radius of footprint 304 can be reduced by using both a narrow transmission beam and a lower transmit power. A user may then be instructed to move the Wi-Fi device to be configured directly in front of and within a few feet of wireless access point 302.

E. Highest Antenna Attenuation

According to another embodiment of the invention, wireless access point 104 uses antenna attenuation during Wi-Fi device configuration to reduce the likelihood of an eavesdropper intercepting configuration messages between wireless access point 104 and Wi-Fi devices being configured. This generally includes adjusting the antenna attenuation to reduce signal strength and limit the transmission range.

IV. Implementation Mechanisms

Figure 4:
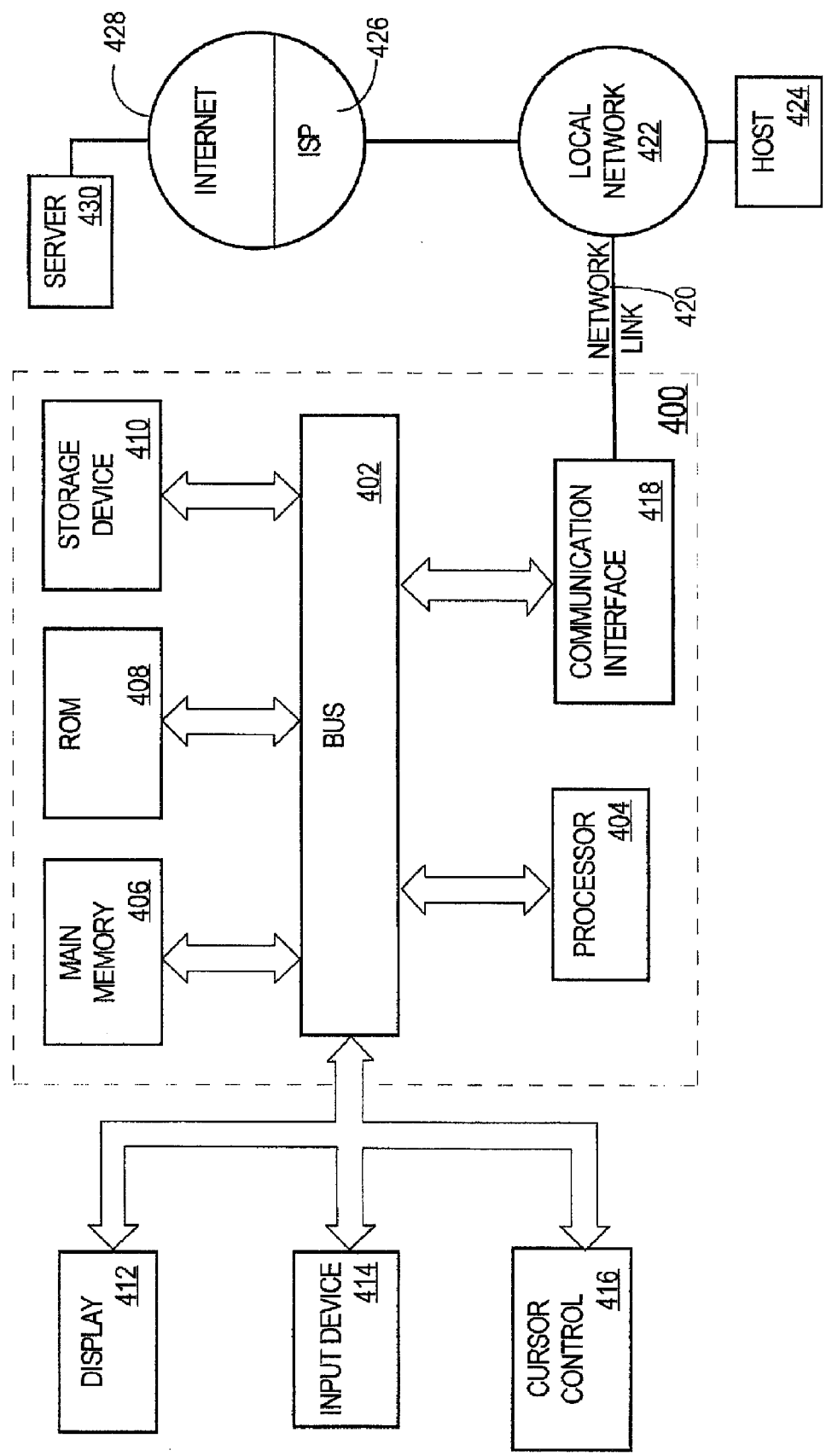
FIG. 4 is a block diagram of a computer system on which embodiments of the invention may be implemented.

The approach for configuring Wi-Fi devices described herein may be implemented on a wide variety of computing architectures and platforms and the approach is not limited to any particular architecture, platform or context. For purposes of explanation, FIG. 4 is a block diagram that depicts an example computer system 400 upon which embodiments of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 400, various computer-readable media are involved, for example, in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for configuring a Wi-Fi device, the computer-implemented method comprising:
   a wireless access point receiving a configuration request from an unregistered Wi-Fi device; and
   in response to receiving the configuration request from the unregistered Wi-Fi device, the wireless access point:
      changing its operating mode from a normal operating mode to a configuration operating mode by changing one or more operating parameter values from one or more original values to one or more configuration mode values, wherein when operating in the configuration operating mode, the wireless access point operates with a higher antenna attenuation when operating in the configuration operating mode than when operating in the normal operating mode,
      exchanging one or more configuration messages with the unregistered Wi-Fi device to register the unregistered Wi-Fi device with the wireless access point, and
      upon registering the unregistered Wi-Fi device with the wireless access point, the wireless access point changing its operating mode from the configuration operating mode to the normal operating mode by changing the one or more values of the operating parameters from the one or more configuration mode values to the one or more original values.

2. The computer-implemented method as recited in claim 1, wherein the wireless access point further operates with less operating power when operating in the configuration operating mode than when operating in the normal operating mode.

3. A computer-implemented method for configuring a Wi-Fi device, the computer-implemented method comprising:
   a wireless access point receiving a configuration request from an unregistered Wi-Fi device; and
   in response to receiving the configuration request from the unregistered Wi-Fi device, the wireless access point:
      changing its operating mode from a normal operating mode to a configuration operating mode by changing one or more operating parameter values from one or more original values to one or more configuration mode values, wherein when operating in the configuration operating mode, the wireless access point communicates with the unregistered Wi-Fi device via a directional beam that transmits in the direction of the unregistered Wi-Fi device,
      exchanging one or more configuration messages with the unregistered Wi-Fi device to register the unregistered Wi-Fi device with the wireless access point, and
      upon registering the unregistered Wi-Fi device with the wireless access point, the wireless access point changing its operating mode from the configuration operating mode to the normal operating mode by changing the one or more values of the operating parameters from the one or more configuration mode values to the one or more original values.

4. A computer-implemented method for configuring a Wi-Fi device, the computer-implemented method comprising:
   a wireless access point receiving a configuration request from an unregistered Wi-Fi device; and
   in response to receiving the configuration request from the unregistered Wi-Fi device, the wireless access point:
      changing its operating mode from a normal operating mode to a configuration operating mode by changing one or more operating parameter values from one or more original values to one or more configuration mode values, wherein when operating in the configuration operating mode, the wireless access point communicates with a higher data transmission rate when operating in the configuration operating mode than when the wireless access point operates in the normal operating mode,
      exchanging one or more configuration messages with the unregistered Wi-Fi device to register the unregistered Wi-Fi device with the wireless access point, and
      upon registering the unregistered Wi-Fi device with the wireless access point, the wireless access point changing its operating mode from the configuration operating mode to the normal operating mode by changing the one or more values of the operating parameters from the one or more configuration mode values to the one or more original values.

5. A computer-implemented method for configuring a Wi-Fi device, the computer-implemented method comprising:
   a wireless access point receiving a configuration request from an unregistered Wi-Fi device; and
   in response to receiving the configuration request from the unregistered Wi-Fi device, the wireless access point:
      changing its operating mode from a normal operating mode to a configuration operating mode by changing one or more operating parameter values from one or more original values to one or more configuration mode values, wherein when operating in the configuration operating mode, the wireless access point reduces a number of re-transmissions compared to when the wireless access point operates in the normal operating mode,
      exchanging one or more configuration messages with the unregistered Wi-Fi device to register the unregistered Wi-Fi device with the wireless access point, and
      upon registering the unregistered Wi-Fi device with the wireless access point, the wireless access point changing its operating mode from the configuration operating mode to the normal operating mode by changing the one or more values of the operating parameters from the one or more configuration mode values to the one or more original values.

6. The computer-implemented method as recited in claim 5, wherein when operating in the configuration operating mode, the wireless access point does not re-transmit any data.

7. A non-transitory computer-readable medium for configuring a Wi-Fi device, the computer-readable medium carrying instructions which, when processed by one or more processors, cause:
   a wireless access point receiving a configuration request from an unregistered Wi-Fi device; and
   in response to receiving the configuration request from the unregistered Wi-Fi device, the wireless access point:
      changing its operating mode from a normal operating mode to a configuration operating mode by changing one or more operating parameter values from one or more original values to one or more configuration mode values, wherein when operating in the configuration operating mode, the wireless access point operates with a higher antenna attenuation when operating in the configuration operating mode than when operating in the normal operating mode,
      exchanging one or more configuration messages with the unregistered Wi-Fi device to register the unregistered Wi-Fi device with the wireless access point, and
      upon registering the unregistered Wi-Fi device with the wireless access point, the wireless access point changing its operating mode from the configuration operating mode to the normal operating mode by changing the one or more values of the operating parameters from the one or more configuration mode values to the one or more original values.

8. The non-transitory computer-readable medium as recited in claim 7, wherein the wireless access point further operates with less operating power when operating in the configuration operating mode than when operating in the normal operating mode.

9. A non-transitory computer-readable medium for configuring a Wi-Fi device, the computer-readable medium carrying instructions which, when processed by one or more processors, cause:
  a wireless access point receiving a configuration request from an unregistered Wi-Fi device; and
  in response to receiving the configuration request from the unregistered Wi-Fi device, the wireless access point:
    changing its operating mode from a normal operating mode to a configuration operating mode by changing one or more operating parameter values from one or more original values to one or more configuration mode values, wherein when operating in the configuration operating mode, the wireless access point communicates with the unregistered Wi-Fi device via a directional beam that transmits in the direction of the unregistered Wi-Fi device,
    exchanging one or more configuration messages with the unregistered Wi-Fi device to register the unregistered Wi-Fi device with the wireless access point, and
    upon registering the unregistered Wi-Fi device with the wireless access point, the wireless access point changing its operating mode from the configuration operating mode to the normal operating mode by changing the one or more values of the operating parameters from the one or more configuration mode values to the one or more original values.

10. A non-transitory computer-readable medium for configuring a Wi-Fi device, the computer-readable medium carrying instructions which, when processed by one or more processors, cause:
  a wireless access point receiving a configuration request from an unregistered Wi-Fi device; and
  in response to receiving the configuration request from the unregistered Wi-Fi device, the wireless access point:
    changing its operating mode from a normal operating mode to a configuration operating mode by changing one or more operating parameter values from one or more original values to one or more configuration mode values, wherein when operating in the configuration operating mode, the wireless access point communicates with a higher data transmission rate when operating in the configuration operating mode than when the wireless access point operates in the normal operating mode,
    exchanging one or more configuration messages with the unregistered Wi-Fi device to register the unregistered Wi-Fi device with the wireless access point, and
    upon registering the unregistered Wi-Fi device with the wireless access point, the wireless access point changing its operating mode from the configuration operating mode to the normal operating mode by changing the one or more values of the operating parameters from the one or more configuration mode values to the one or more original values.

11. A non-transitory computer-readable medium for configuring a Wi-Fi device, the computer-readable medium carrying instructions which, when processed by one or more processors, cause:
  a wireless access point receiving a configuration request from an unregistered Wi-Fi device; and
  in response to receiving the configuration request from the unregistered Wi-Fi device, the wireless access point:
    changing its operating mode from a normal operating mode to a configuration operating mode by changing one or more operating parameter values from one or more original values to one or more configuration mode values, wherein when operating in the configuration operating mode, the wireless access point reduces a number of re-transmissions compared to when the wireless access point operates in the normal operating mode,
    exchanging one or more configuration messages with the unregistered Wi-Fi device to register the unregistered Wi-Fi device with the wireless access point, and
    upon registering the unregistered Wi-Fi device with the wireless access point, the wireless access point changing its operating mode from the configuration operating mode to the normal operating mode by changing the one or more values of the operating parameters from the one or more configuration mode values to the one or more original values.

12. The non-transitory computer-readable medium as recited in claim 11, wherein when operating in the configuration operating mode, the wireless access point does not re-transmit any data.

13. A wireless access point comprising:
  one or more processors; and
  a memory storing instructions which, when processed by the one or more processors, cause:
  a wireless access point receiving a configuration request from an unregistered Wi-Fi device; and
  in response to receiving the configuration request from the unregistered Wi-Fi device, the wireless access point:
    changing its operating mode from a normal operating mode to a configuration operating mode by changing one or more operating parameter values from one or more original values to one or more configuration mode values, wherein when operating in the configuration operating mode, the wireless access point operates with a higher antenna attenuation when operating in the configuration operating mode than when operating in the normal operating mode,
    exchanging one or more configuration messages with the unregistered Wi-Fi device to register the unregistered Wi-Fi device with the wireless access point, and
    upon registering the unregistered Wi-Fi device with the wireless access point, the wireless access point changing its operating mode from the configuration operating mode to the normal operating mode by changing the one or more values of the operating parameters from the one or more configuration mode values to the one or more original values.

14. The wireless access point as recited in claim 13, wherein the wireless access point further operates with less operating power when operating in the configuration operating mode than when operating in the normal operating mode.

15. A wireless access point comprising:
  one or more processors; and
  a memory storing instructions which, when processed by the one or more processors, cause:
  a wireless access point receiving a configuration request from an unregistered Wi-Fi device; and in response to receiving the configuration request from the unregistered Wi-Fi device, the wireless access point:
  changing its operating mode from a normal operating mode to a configuration operating mode by changing one or more operating parameter values from one or more original values to one or more configuration mode values, wherein when operating in the configuration operating mode, the wireless access point communicates with the unregistered Wi-Fi device via a directional beam that transmits in the direction of the unregistered Wi-Fi device,
  exchanging one or more configuration messages with the unregistered Wi-Fi device to register the unregistered Wi-Fi device with the wireless access point, and
  upon registering the unregistered Wi-Fi device with the wireless access point, the wireless access point changing its operating mode from the configuration operating mode to the normal operating mode by changing the one or more values of the operating parameters from the one or more configuration mode values to the one or more original values.

16. A wireless access point comprising:
one or more processors; and
a memory storing instructions which, when processed by the one or more processors, cause:
a wireless access point receiving a configuration request from an unregistered Wi-Fi device; and
in response to receiving the configuration request from the unregistered Wi-Fi device, the wireless access point:
  changing its operating mode from a normal operating mode to a configuration operating mode by changing one or more operating parameter values from one or more original values to one or more configuration mode values, wherein when operating in the configuration operating mode, the wireless access point communicates with a higher data transmission rate when operating in the configuration operating mode than when the wireless access point operates in the normal operating mode,
  exchanging one or more configuration messages with the unregistered Wi-Fi device to register the unregistered Wi-Fi device with the wireless access point, and
  upon registering the unregistered Wi-Fi device with the wireless access point, the wireless access point changing its operating mode from the configuration operating mode to the normal operating mode by changing the one or more values of the operating parameters from the one or more configuration mode values to the one or more original values.

17. A wireless access point comprising:
one or more processors; and
a memory storing instructions which, when processed by the one or more processors, cause:
a wireless access point receiving a configuration request from an unregistered Wi-Fi device; and
in response to receiving the configuration request from the unregistered Wi-Fi device, the wireless access point:
  changing its operating mode from a normal operating mode to a configuration operating mode by changing one or more operating parameter values from one or more original values to one or more configuration mode values, wherein when operating in the configuration operating mode, the wireless access point reduces a number of re-transmissions compared to when the wireless access point operates in the normal operating mode,
  exchanging one or more configuration messages with the unregistered Wi-Fi device to register the unregistered Wi-Fi device with the wireless access point, and
  upon registering the unregistered Wi-Fi device with the wireless access point, the wireless access point changing its operating mode from the configuration operating mode to the normal operating mode by changing the one or more values of the operating parameters from the one or more configuration mode values to the one or more original values.

18. The wireless access point as recited in claim 17, wherein when operating in the configuration operating mode, the wireless access point does not re-transmit any data.

* * * * *